United States Patent
Ishiyama et al.

(10) Patent No.: US 8,272,413 B2
(45) Date of Patent: Sep. 25, 2012

(54) PNEUMATIC TIRE FOR MOTORCYCLE

(75) Inventors: Makoto Ishiyama, Kodaira (JP);
Hiroyuki Matsumoto, Kodaira (JP);
Shinsaku Katayama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 982 days.

(21) Appl. No.: 12/064,684

(22) PCT Filed: Aug. 24, 2006

(86) PCT No.: PCT/JP2006/316604
§ 371 (c)(1),
(2), (4) Date: Mar. 11, 2008

(87) PCT Pub. No.: WO2007/023892
PCT Pub. Date: Mar. 1, 2007

(65) Prior Publication Data
US 2009/0255615 A1  Oct. 15, 2009

(30) Foreign Application Priority Data
Aug. 25, 2005 (JP) ................................. 2005-245007

(51) Int. Cl.
*B60C 11/03* (2006.01)
*B60C 11/12* (2006.01)

(52) U.S. Cl. ......... 152/209.11; 152/209.18; 152/209.28; 152/904; 152/DIG. 3

(58) Field of Classification Search ............. 152/209.11, 152/209.18, 209.28, DIG. 3, 904
See application file for complete search history.

(56) References Cited

U.S. PATENT DOCUMENTS

| 2,104,532 | A | * | 1/1938 | Sommer | 152/209.18 |
| 4,353,402 | A | * | 10/1982 | Burche et al. | 152/209.6 |
| 4,726,407 | A | * | 2/1988 | Hayakawa et al. | 152/209.18 |
| 6,200,401 | B1 | * | 3/2001 | Watkins et al. | 156/110.1 |
| 2005/0115653 | A1 | | 6/2005 | Miyasaka et al. | |

FOREIGN PATENT DOCUMENTS

| GB | 2093777 | * | 2/1981 |
| JP | 61-036002 | * | 2/1986 |
| JP | 61-036002 A | | 2/1986 |
| JP | 63-116907 A | | 5/1988 |

(Continued)

*Primary Examiner* — Justin Fischer
*Assistant Examiner* — Robert Dye
(74) *Attorney, Agent, or Firm* — Sughrue Mion, PLLC (57) ABSTRACT

The present invention aims to provide a pneumatic tire for a motorcycle capable of improving turning performance on a wet road surface as compared to that of conventional tires. The pneumatic tire for a motorcycle comprises a tread 28 consisting of a tread central portion having a width of 60% of a tread developed width and tread side portions located outside of the tread central portion in the width direction of the tire and a plurality of wide inclined grooves 42 and narrow inclined grooves 44 inclined at an angle of less than 90 degrees with respect to the circumferential direction of the tire formed in the tread side portion such that the grooves continuously extend over a region of 50% or more of a width of the tread side portion. A groove width of the narrow inclined grooves 44 is set within a range between 0.3 mm and 2.5 mm. A total area of the wide inclined grooves 42 is set to not more than 20% of an area of the tread side portion. Such configuration can satisfy both of drainage performance and block stiffness of the tread contact portion in turning at a high level to obtain a higher grip force in turning on a wet road surface than that of conventional tires.

6 Claims, 7 Drawing Sheets

FOREIGN PATENT DOCUMENTS

| JP | 3-271004 | * | 12/1991 |
| JP | 5-058116 | * | 3/1993 |
| JP | 5-201207 | * | 8/1993 |
| JP | 7-228107 | * | 2/1994 |
| JP | 9-109615 | * | 4/1997 |
| JP | 2003-211917 | A | 7/2003 |

* cited by examiner

PNEUMATIC TIRE FOR MOTORCYCLE

TECHNICAL FIELD

The present invention relates to a pneumatic tire for a motorcycle and particularly relates to a pneumatic tire for a motorcycle capable of improving turning performance on a wet road surface.

RELATED ART

A tire is provided with grooves on its tread portion to enable rubber of the tread surface to obtain an excellent contact state free of a water film during traveling on a wet road surface (refer to JP-2003-211917A, for example). That is, the grooves provided on the tread portion serve as escape routes of water squeezed by the tread and the road surface so as to efficiently drain such water.

Regarding a tread pattern for a motorcycle, designing a groove arrangement is technically difficult and is a key factor in determining wet performance. Therefore, a tread pattern is designed to ensure a good balance between a groove arrangement capable of efficient water drainage and good appearance in design.

A motorcycle turns a corner with its vehicle body being inclined, so that a tire for a motorcycle, unlike a tire for a passenger car or a truck, has different contact regions of the tread surface during straightly traveling with the vehicle body not being inclined from that during cornering with the vehicle body being inclined. Therefore, a tire for a motorcycle sometimes has different types of patterns in the tread center side and in the tread shoulder sides.

That is, grooves in the center side are formed so that the tread has high stiffness against a force in the back and forth direction of the tire (i.e. the circumferential direction of the tire, the tire equatorial direction) while grooves in the shoulder side are formed so that the tread has high stiffness against forces both in the width direction of the tire (lateral force) and the circumferential direction of the tire (traction, brake).

Since a motorcycle turns a corner with its vehicle body being inclined, the shoulder side is subjected to mainly a lateral force during turning at a constant speed without opening the throttle or without applying the brake, while the shoulder side is subjected to both a lateral force and a driving force during accelerating from a state where the motorcycle turns at a constant speed. Therefore, a pattern in the shoulder side should be provided with a pattern having high stiffness both against a lateral force and a driving force.

As described above, a tire for a motorcycle is required to have good grip performance at the shoulder side against lateral and driving forces.

In view of vehicle body properties of a motorcycle, a rear wheel is subjected to a driving force so that the rear wheel is required to grip the road especially against a driving force.

On the other hand, since a front wheel is subjected not to a driving force but to a large braking force in braking due to a load of the vehicle body, the front wheel needs a grip force in the back and forth direction against a braking force and a grip force in the lateral direction against a lateral force.

Particularly in a motorcycle race, driving stability in turning is significantly important.

During cornering in rainy whether, a tire having poor wet turning performance cannot travel at high speed, and thus cannot shorten a lap time. In addition, a tire of a general passenger car having poor wet turning performance is likely to skid on a general road.

DISCLOSURE OF THE INVENTION

The present invention aims to overcome the above-mentioned problems and to provide a pneumatic tire for a motorcycle capable of improving turning performance on a wet road surface as compared to that of conventional tires.

Regarding wet performance, a groove depth, a groove width and a groove volume have been emphasized.

The shoulder side of a tire for a motorcycle is a very important portion to improve turning performance since the shoulder side is subjected to a lateral force as well as braking and driving forces as mentioned above.

When a vehicle turns a corner, the tread portion of the tire contacts the road surface in the shoulder side (tread ends side). It has been considered that grooves in the shoulder side needs a certain amount of width for sufficient water drainage. Therefore, it is considered that a thin groove having a width of about 1.0 mm, which is referred to as a sipe, is not suitable for draining water and that forming this sipe on the tread portion is nothing more than cutting a land portion of the tread portion, which results in reducing block stiffness, increasing deformation volume of the block and reducing a grip force. Accordingly, a tire for a motorcycle provided with a sipe is used only on a road under particular weather conditions such as a snow road or an ice road.

Conventionally, based on the recognition that a wide groove is capable of sufficiently draining water, groove in a tire for a motorcycle generally has a groove width of not more than 3 mm. It is generally considered that a thin groove such as a sipe incapable of sufficiently draining water and is more likely to cause a hydroplaning phenomenon.

The inventors have studied on groove formation capable of improving wet driving stability especially from the standpoint of a groove width, to come up with an idea that a thin groove such as a sipe can obtain sufficient drainage effect and that results in obtaining a larger area of a land portion, that is, obtaining a larger contact area of the road surface and the tire surface so as to improve grip performance.

A non-limiting embodiment of a pneumatic tire for a motorcycle is designed in view of the above-mentioned facts and comprises a tread consisting of a tread central portion having a width of 60% of a tread developed width with a tire equatorial plane being as its center and tread side portions located outside of the tread central portion in the width direction of the tire, and at least one of a plurality of lateral grooves along the width direction of the tire and a plurality of inclined grooves inclined at an angle of less than 90 degrees with respect to the circumferential direction of the tire formed in the tread side portion such that the grooves continuously extend over a region of 50% or more of a width of the tread side portion and are spaced in the circumferential direction of the tire, wherein the plurality of the lateral/inclined grooves comprise a narrow lateral/inclined groove, which continuously extends over a region of 50% or more of the width of the tread side portion and has a groove width within a range between 0.3 mm and 2.5 mm, and a total area of the plurality of the lateral/inclined grooves having a groove width of more than 2.5 mm is set to not more than 20% of an area of the tread side portion.

Next, the operation of the above pneumatic tire for a motorcycle will be described.

This pneumatic tire for a motorcycle, in which the pattern has been invented as described above, can simultaneously satisfy high drainage performance and high block stiffness of the tread contact portion in turning, which gives a higher grip force in turning on a wet road surface than that of conventional tires.

In this tire, some of the plurality of the lateral/inclined grooves are narrow lateral/inclined grooves, which have a groove width within a range between 0.3 mm and 2.5 mm and have a length of the tire widthwise component of 50% or more of the width of the tread side portion.

That is, one tread side portion has a width of 20% of the total tread width and thus 50% of the tread side portion corresponds to 10% of the total tread width. Therefore, when the narrow lateral/inclined grooves have a length of their tire widthwise component of not more than the above-mentioned length, the grooves themselves have no use and drainage effect becomes insufficient.

In this case, when a number of wide lateral/inclined grooves having a groove width of more than 2.5 mm are provided, drainage effect is increased but a surface area of the land portions of the tread side portion is extremely reduced so that an area of the tread contacting the road surface is reduced to lower a grip force.

Therefore, the ratio of a total area of the wide lateral/inclined grooves having a groove width of more than 2.5 mm needs to be set to not more than 20%.

The narrow lateral/inclined grooves having a groove width of less than 0.3 mm cannot obtain sufficient drainage effect. Also in this case, a component part of a mold, which is used for forming a groove and referred to as a blade, becomes too thin to give durability of the mold.

It is noted that the groove width of the inclined grooves means an average of groove widths of the inclined grooves provided in the tread side portion.

The invention according to another non-limiting embodiment is a pneumatic tire for a motor cycle, wherein a spacing between grooves is within a range between 5 mm and 20 mm in the tread side portion.

Next, the operation of the above pneumatic tire for a motorcycle will be described.

When a spacing between grooves in the tread side portion is less than 5 mm, a land portion formed between grooves becomes so thin as to extremely reduce stiffness of the land portion.

On the other hand, when a spacing between grooves is more than 20 mm, an area of a land portion formed between grooves is so large as to increase a travel distance of water squeezed by the land portion surface and the road surface to be drained to near grooves and more likely to cause a hydroplaning phenomenon.

It is noted that "the spacing between grooves" (a width of the land portion) means an average of spacings between grooves provided in the tread side portion.

In the tread side portion, the grooves may be spaced evenly or unevenly. In a general tire, in order to disperse frequency of sound (pattern noise) generated during traveling, a method is used, in which a spacing between grooves is uneven on the circumference, which is referred to as pitch variation. Also in the present invention, several kinds of spacing between grooves may be provided.

A pneumatic tire for a motor cycle according yet another non-limiting embodiment, comprises a tread consisting of a tread central portion having a width of 60% of a tread developed width with a tire equatorial plane being as its center and tread side portions located outside of the tread central portion in the width direction of the tire, and at least one of a plurality of lateral grooves along the width direction of the tire and a plurality of inclined grooves inclined at an angle of less than 90 degrees with respect to the circumferential direction of the tire formed in the tread side portion such that the grooves continuously extend over a region of 50% or more of a width of the tread side portion and are spaced in the circumferential direction of the tire, wherein all of the plurality of the lateral/inclined grooves are narrow lateral/inclined grooves, which have a groove width within a range between 0.3 mm and 2.5 mm, and a spacing between the lateral/inclined grooves is within a range between 5 mm and 20 mm.

Next, the operation of the above pneumatic tire for a motorcycle will be described.

In a pneumatic tire for a motorcycle, as well as the narrow lateral/inclined grooves having a groove width within a range between 0.3 mm and 2.5 mm, the wide lateral/inclined grooves having a groove width of more than 2.5 mm are provided in the tread side portion, while wide lateral/inclined grooves having a groove width of more than 2.5 mm are not provided in the tread side portion.

Therefore, the pneumatic tire for a motorcycle can simultaneously satisfy high drainage performance and high block stiffness of the tread contact portion in turning, which gives a higher grip force in turning on a wet road surface than that of conventional tires.

It is noted that the groove width of the inclined grooves means an average of groove widths of the inclined grooves provided in the tread side portion.

When a spacing between grooves in the tread side portion is less than 5 mm, as mentioned above, land portion formed between the grooves becomes so thin as to extremely reduce stiffness of the land portion.

On the other hand, the spacing between grooves is more than 20 mm, as mentioned above, an area of a land portion formed between grooves is so large as to increase a travel distance of water squeezed by the land portion surface and the road surface to be drained to near grooves and more likely to cause a hydroplaning phenomenon.

It is noted that the spacing between grooves (a width of the land portion) means an average of spacings between grooves provided in the tread side portion.

The invention according to a further non-limiting embodiment is a pneumatic tire for a motor cycle, wherein a ratio of a total area of the narrow lateral/inclined grooves to a surface area of the tread side portion is within a range between 5% and 20%.

Next, the operation of the above pneumatic tire for a motorcycle will be described.

When a ratio of a total area of the narrow lateral/inclined grooves to a surface area of the tread side portion, that is, a negative ratio of the tread side portion is less than 5%, water drainage of the tread side portion contacting the road surface in turning is insufficient.

On the other hand, when the ratio, that is, the negative ratio of the tread side portion is more than 20%, block stiffness of the tread side portion contacting the ground in turning and an area of the tread side portion contacting the road surface are insufficient.

The invention according to another non-limiting embodiment is a pneumatic tire for a motor cycle, wherein the inclined groove is inclined so that a shoulder side thereof is located ahead of the tire equatorial plane side thereof in the rotation direction of the tire.

Next, the operation of the above pneumatic tire for a motorcycle will be described.

In a motorcycle, a front wheel is subjected mainly to a braking force and a lateral force while a rear wheel is subjected mainly to a driving force and a lateral force. Although both the front and rear wheels are subjected to a lateral force, as a force in the back and forth direction, the front wheel is subjected to a braking force and the rear wheel is subjected to a driving force.

Therefore, it is preferable that in the front wheel, the inclined groove inclines so that a shoulder side thereof is located ahead of the tire equatorial plane side thereof in the rotation direction of the tire, because when a lateral force and a braking force are simultaneously applied, their resultant force is oriented to the same direction of the inclination of the inclined grooves so as to effectively restrain deformation of the land portion.

The invention according to another non-limiting embodiment is a pneumatic tire for a motor cycle, wherein the inclined groove inclines so that the tire equatorial plane side thereof is located ahead of a shoulder side thereof in the rotation direction of the tire.

Next, the operation of the above pneumatic tire for a motorcycle will be described.

The rear wheel is subjected mainly to a driving force and a lateral force. Therefore, it is preferable that in the rear wheel, the inclined groove is inclined such that the tire equatorial plane side thereof is located ahead of a shoulder side thereof in the rotation direction of the tire, because when a lateral force and a braking force are simultaneously applied, their resultant force is oriented to the same direction of the inclination of the inclined grooves so as to effectively restrain deformation of the land portion.

The invention according to yet another non-limiting embodiment is a pneumatic tire for a motor cycle, wherein the inclined groove increases its angle with respect to the circumferential direction of the tire from the tire equatorial plane side to the shoulder side so that the angle in the tire equatorial plane side is set within a range between 10 degrees and 30 degrees and the angle in the shoulder side is set within a range between 50 degrees and 90 degrees.

Next, the operation of the above pneumatic tire for a motorcycle will be described.

When a motorcycle turns a deep corner, using with the vehicle body being largely inclined and with a region near the tread end portion of the tire contacting a road surface, the tire is subjected to a larger force in the lateral direction than a force in back and forth direction. Therefore, the land portion near the tread end preferably extends along the force in the lateral direction, that is, the angle of the inclined groove separating the land portion in the shoulder side is preferably set within a range between 50 degrees and 90 degrees.

This is applicable to both of the front and rear wheels.

On the contrary, when a motorcycle leaves a corner by accelerating from a state where the vehicle body is largely inclined, the rear tire is subjected to a driving force in addition to a lateral force. With acceleration, the inclined vehicle body is gradually raised. That is, with acceleration the tread contact region of the tire moves from the tread end side to the tire equatorial plane side. With acceleration, a ratio of a lateral force is reduced and a ratio of an accelerating force is increased so that their resultant force gets closer to the circumferential direction from the lateral direction of the tire.

The front wheel is generally subjected to a braking force in a state that the inclined angle of the vehicle body is relatively small, so that a ratio of the lateral force is reduced and a ratio of the braking force is increased.

Therefore, it is preferable that the angle of the inclined groove in the shoulder side is set within a range between 50 degrees and 90 degrees and the angle of the inclined groove in the tire equatorial plane side is set within a range between 10 degrees and 30 degrees.

It is noted that the angle of the inclined groove is preferably set symmetrically on the right and left sides of the tire equatorial plane because tire performance is identical in turning right and left.

In the intermediate region between the tire equatorial plane side and the shoulder side, the angle is a preferable intermediate value between the angle of the inclined groove at the tire equatorial plane side and the angle of the inclined groove at the shoulder side so that the angle of the groove is gradually increased from the tire equatorial plane side to the shoulder side.

As described above, a pneumatic tire for a motorcycle according to the present invention has a great effect capable of improving turning performance on a wet road surface as compared to that of conventional tires.

REFERENCE SYMBOLS

10 pneumatic tire for motorcycle
28 tread
42 wide inclined groove
44 narrow inclined groove
46 land portion
50 wide inclined groove
52 narrow inclined groove
56 land portion

BEST MODE FOR CARRYING OUT THE INVENTION

First Embodiment

A first embodiment of a pneumatic tire for a motorcycle of the present invention will be described with reference to FIGS. 1 and 2.

(Carcass)

Figure 1:
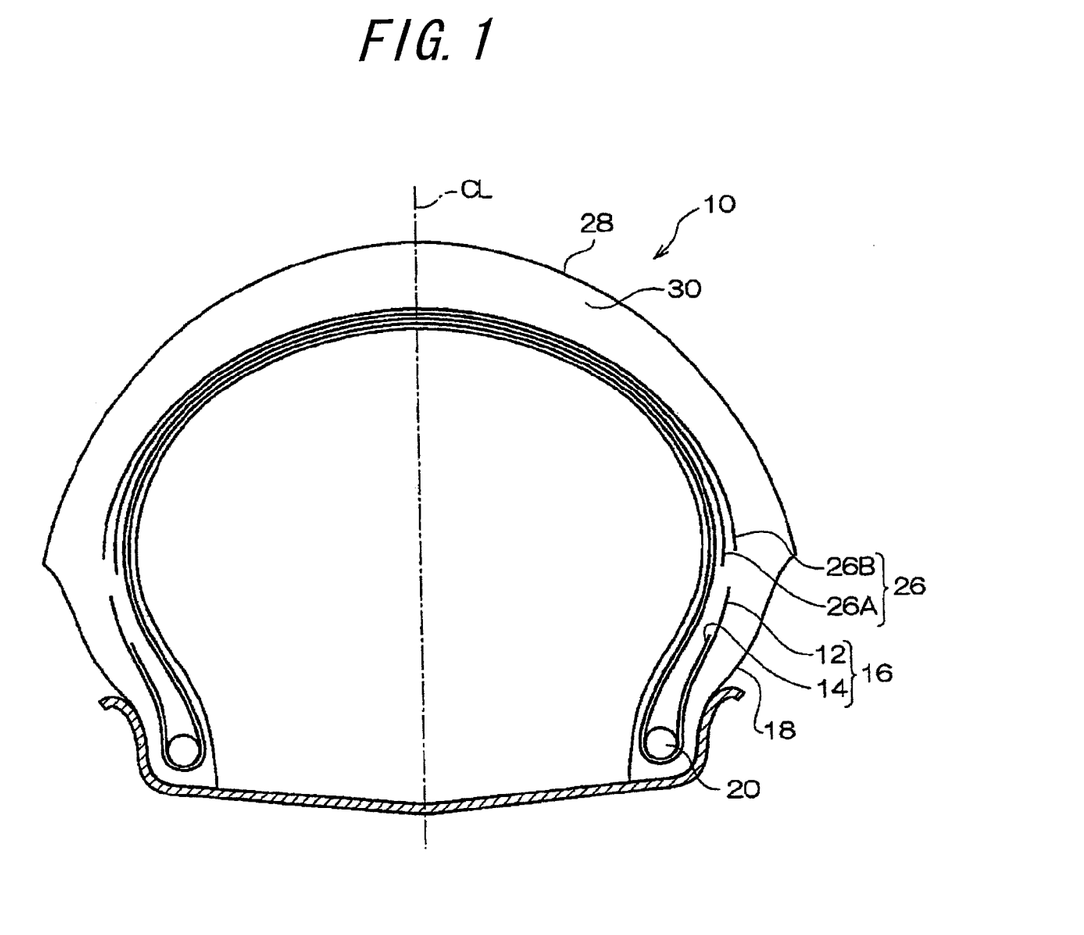
FIG. 1 is a sectional view of a pneumatic tire for a motorcycle along an axis of rotation according to a first embodiment.

As a sectional view along an axis of rotation of a tire is shown in FIG. 1, a pneumatic tire 10 for a motorcycle of this embodiment has a carcass 16 consisting of a first carcass ply 12, in which cords extending in the inclined direction with respect to a tire equatorial plane CL are embedded and a second carcass ply 14, in which cords extending in the opposite inclined direction of said cords with respect to the tire equatorial plane CL.

The tire 10 for a motorcycle of this embodiment is used for a front wheel and has a tire size of 120/60R17.

Both ends of the first carcass ply 12 and the second carcass ply 14 are turned around bead cores 20, which are embedded in bead portions 18, from the inner to outer sides of the tire.

The first carcass ply 12 is formed by arranging a plurality of cords (for example, organic fiber cords such as nylon) extending in the radial direction of the tire parallel to one another to be embedded in coating rubber. In this embodiment, an angle of the cords of the first carcass ply 12 at the tire equatorial plane with respect to the tire equatorial plane is set to 80 degrees. The second carcass ply 14 is also formed by arranging a plurality of cords (for example, organic fiber cords such as nylon) extending in the radial direction of the tire parallel to one another to be embedded in coating rubber. In this embodiment, an angle of the cords of the second carcass ply 14 with respect to tire equatorial plane is set to 80 degrees. The cords of the first and second carcass plies 12, 14 intersect with each other and are inclined in the opposite directions with respect to the tire equatorial plane CL. Although in this embodiment the angle of the cords is set to 80 degrees, it may be set to other value such as 90 degrees.

(Main Intersecting Layer)

A main intersecting layer 26 is provided radially outside of the carcass 16.

The main intersecting layer 26 of this embodiment consists of a first belt ply 26A and a second belt ply 26B.

The first belt ply 26A is formed by arranging a plurality of cords (aromatic polyamide fibers plying having a diameter of 0.7 mm in this embodiment) parallel to one another with a thread density of 50 threads per 50 mm to be embedded in coating rubber. The angle of the cords with respect to the tire equatorial plane on the tire equatorial plane is set to 33 degrees. The second belt ply 26B is also formed by arranging a plurality of cords (aromatic polyamide fibers plying having a diameter of 0.7 mm in this embodiment) parallel to one another with a thread density of 50 threads per 50 mm to be embedded in coating rubber. The angle of the cords with respect to the tire equatorial plane is set to 33 degrees.

The cords of the first and second belt plies 26A, 26B intersect with each other and are inclined in the opposite directions with respect to the tire equatorial plane CL.

Tread rubber 30 forming a tread 28 is provided radially outside of the main intersecting layer 26.

Although in this embodiment, the main intersecting layer 26 consists of two belt plies, it may consist of three or more belt plies. Although, in this embodiment, the main intersecting layer 26 is used to reinforce a crown portion of the carcass 16, a spiral belt layer, which is often used in recent pneumatic tires for a high-performance motorcycle may be used.

The spiral belt layer is formed by spirally winding a long rubber-coated cord made of a cord coated with unvulcanized coating rubber or a strip-shaped ply made of a plurality of cords coated with unvulcanized coating rubber and the cord of the spiral belt layer extends in the substantially circumferential direction of the tire. The cord of the spiral belt layer may be an organic fiber cord or a steel cord.

More specifically, the spiral belt layer can be formed by spirally winding an aromatic polyamide fiber cord plying, having a diameter of 0.7 mm, to be embedded in coating rubber with a thread density of 50 threads per 50 mm.

Thus-formed spiral belt layer may be provided radially outside of the main intersecting layer 26 or a spiral belt layer.

Alternatively, a spiral belt layer in which steel cords are embedded may be used instead of the main intersecting layer 26.

(Tread Pattern)

Figure 2:
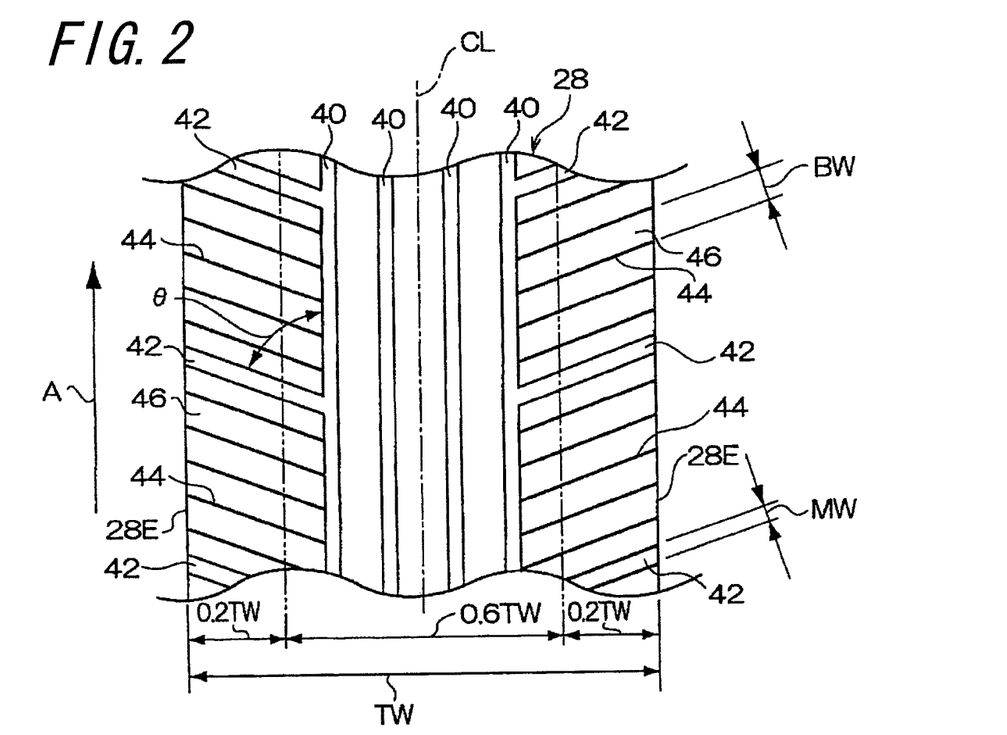
FIG. 2 is a development view of a tread of a pneumatic tire (Example tire 1 in tests) for a motorcycle according to a first embodiment.

FIG. 2 is a development view of a tread 28, in which as shown in this figure, two circumferential main grooves 40 which have a groove width of 4 mm and extend in the circumferential direction of the tire are provided in each side of the tire equatorial plane CL. There are also provided, in the tread 28, wide inclined grooves 42 and narrow inclined grooves 44 extending from the circumferential main groove 40 located outside in the width direction of the tire towards a tread end.

Hereinafter, by using a tread developed width TW, a region (inside of two two-dot chain lines) having a width of 60% of the tread developed width TW with the tire equatorial plane CL being as its center is referred to as a tread central portion and regions (outside of two two-dot chain lines) located outside of the tread central portion in the width direction of the tire are referred to as tread side portions.

In this embodiment, five narrow inclined grooves 44 having a groove width of 1 mm are provided between wide inclined grooves 42 having a groove width (MW) of 8 mm. In the present invention, a ratio of a total area of the wide inclined grooves 42 to an area of the tread side portion should be not more than 20% and in this embodiment it is set to 11%.

The wide inclined grooves 42 and the narrow inclined grooves 44 should continuously extend over a region of 50% or more of a width of the tread side portion. In this embodiment, the tread developed width TW of the tread 28 is 150 mm and the wide inclined grooves 42 and the narrow inclined grooves 44 continuously extend in a region of 40 mm from a tread end 28E to the tire equatorial plane.

In the tread side portions, an elongated land portion 46 separated by inclined grooves preferably has a width (a spacing between grooves) BW within a range between 5 mm and 20 mm. In this embodiment, it is set to 10 mm.

The wide inclined groove 42 and the narrow inclined groove 44 are inclined so that the tread end side thereof is located ahead of the tire equatorial plane side thereof in the rotation direction of the tire (in the direction of an arrow A). In this embodiment, angles θ of the wide inclined groove 42 and the narrow inclined groove 44 with respect to the circumferential direction of the tire are set to 75 degrees.

In this embodiment, all of the circumferential main groove 40, the wide inclined groove 42 and the narrow inclined groove 44 have a groove depth of 6 mm.

Since the tread 28 of a motorcycle is round, a diameter at the tire equatorial plane CL is maximal and a diameter at the tread end 28E is smaller than the diameter at the tire equatorial plane CL. FIG. 2 is a development view of the tread, in which the illustrated tread end portion is elongated in the circumferential direction of the tire so that the tread end portion has the same length in the circumferential direction as that of the tire equatorial plane portion. In this embodiment, the groove width and the land portion width are averages in the tread side portion.

(Operation)

Next, the operation of the pneumatic tire 10 for a motorcycle of this embodiment will be described.

The pneumatic tire 10 for a motorcycle of this embodiment exerts the effect of the present invention when used as a front wheel. The wide inclined groove 42 and the narrow inclined groove 44 are inclined so that the tread end side thereof is located ahead of the tire equatorial plane side thereof in the rotation direction of the tire (in the direction of an arrow A). Therefore, when a lateral force and a braking force are simultaneously applied, their resultant force is oriented to the same direction of the inclination of the inclined grooves (that is, the direction of the resultant force is substantially parallel to the longitudinal direction of the land portion) so as to effectively restrain deformation of the land portion.

In the pneumatic tire 10 for a motorcycle of this embodiment, a plurality of the wide inclined grooves 42 and the narrow inclined grooves 44 which continuously extends over a region of 50% or more of the width of the tread side portion are provided, the narrow inclined grooves 44 have a groove width within a range between 0.3 mm and 2.5 mm and a total area of the wide inclined grooves 42 is set to not more than 20% of an area of the tread side portion, to simultaneously satisfy high drainage performance and high block stiffness of the tread contact portion in turning to give a higher grip force in turning on a wet road surface than that of conventional tires.

When the narrow inclined grooves 44 have a length of their tire widthwise component of not more than the above-mentioned length, the grooves themselves have no use and drainage effect becomes insufficient.

On the other hand, when a total area of the wide inclined grooves 42 is more than 20% of an area of the tread side portion, drainage effect is increased but a surface area of the land portion of the tread side portion is extremely reduced so that an area of the tread contacting the road surface is reduced to reduce a grip force.

The narrow inclined grooves 44 having a groove width of less than 0.3 mm cannot give a sufficient drainage effect. Also in this case, a component part of a mold, which is used for forming a groove and referred to as a blade, becomes too thin to give durability of the mold.

When a spacing between grooves in the tread side portion is less than 5 mm, a land portion formed between grooves becomes so thin as to extremely reduce stiffness of the land portion. On the other hand, when a spacing between grooves in the tread side portion is more than 20 mm, an area of the land portion formed between grooves is so large as to increase a travel distance of water squeezed by the land portion surface and the road surface to be drained to near grooves and more likely to cause a hydroplaning phenomenon.

(Test for Front Wheel)

In order to ensure the effect of the performance improvement of the present invention, a comparative test on driving stability with an actual vehicle on a wet road surface is conducted and the test results will be described below.

In the test, several test tires are prepared to be used for a front wheel and a conventional tire is consistently used for a rear wheel.

A test tire is mounted on a front wheel of a sports motorcycle of 1000 cc and the test is very severely (closely to limit) conducted with the actual vehicle in the light rain on a test course. An amount of rainfall is constant for a whole day and the wet condition is kept constant.

As for one test tire, four circuits of a test course are made and the average lap time of the four circuits is obtained. Since all of the test tires have the same pattern in the tread center portion, turning performance in cornering is different.

At the same tire, a test rider totally evaluates his sensitivity to driving stability on a wet road surface on a scale of one to ten. The test results include comments of the test rider.

First, test tires will be described.

Example Tire 1

Example tire 1 is a tire of the above-mentioned first embodiment, having a pattern shown in FIG. 2.

Example Tire 2

Figure 3:
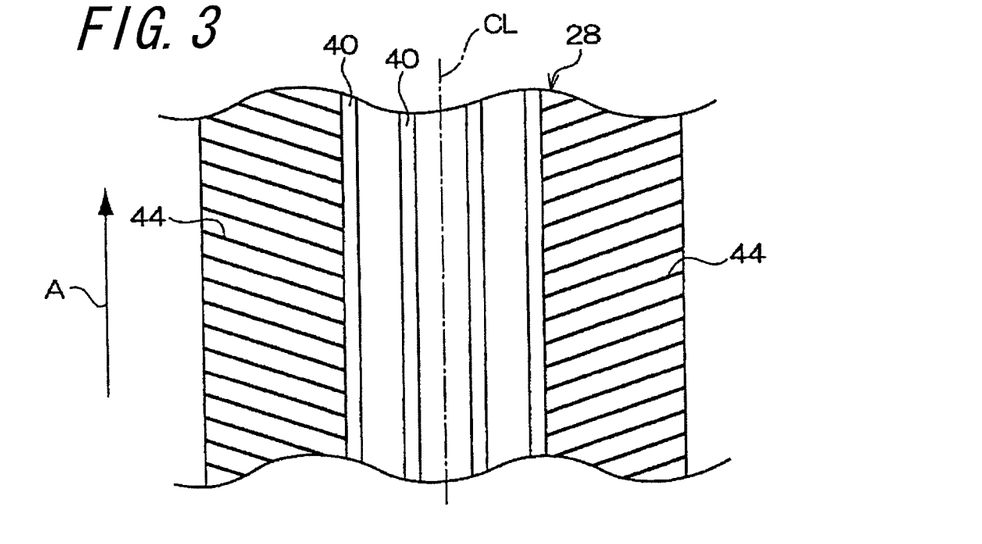
FIG. 3 is a development view of a tread of Example tire 2.

Example tire 2 has a pattern shown in FIG. 3, in which no wide inclined grooves having a groove width of not less than 2.5 mm are not provided in the tread side portions. All grooves provided in the pattern side portions are narrow inclined grooves having a width of 1 mm and elongated land portions separated by these narrow inclined grooves have a width of 8 mm. Except for the above-mentioned points, Example tire 2 has the same configuration of that of Example tire 1.

Example Tire 3

Figure 4:
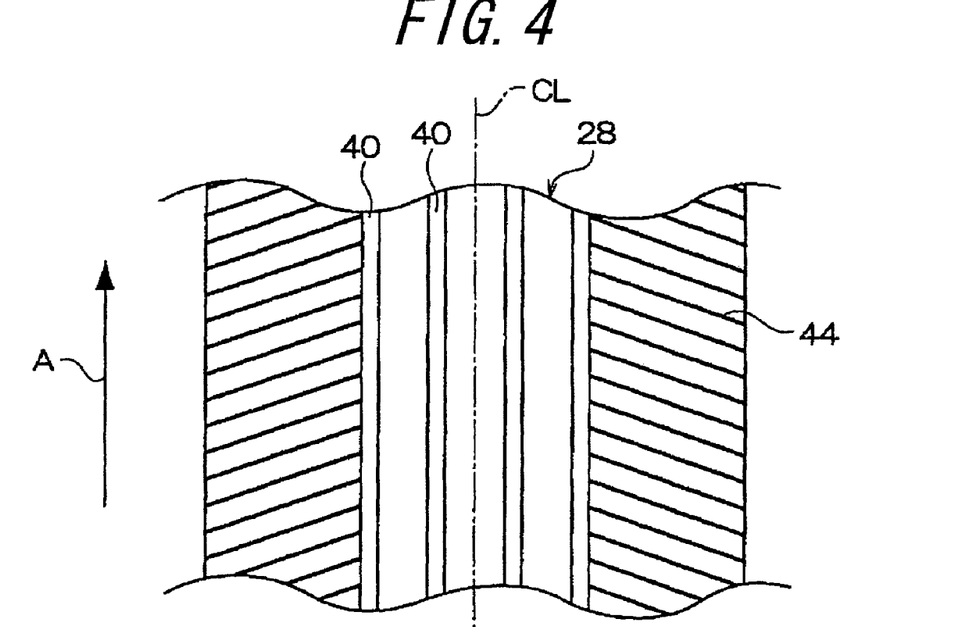
FIG. 4 is a development view of a tread of Example tire 3.

Example tire 3 has a pattern shown in FIG. 4 (the rotation direction of the tire shown in FIG. 3 is reversed)

Comparative Example Tire 1

Figure 5:
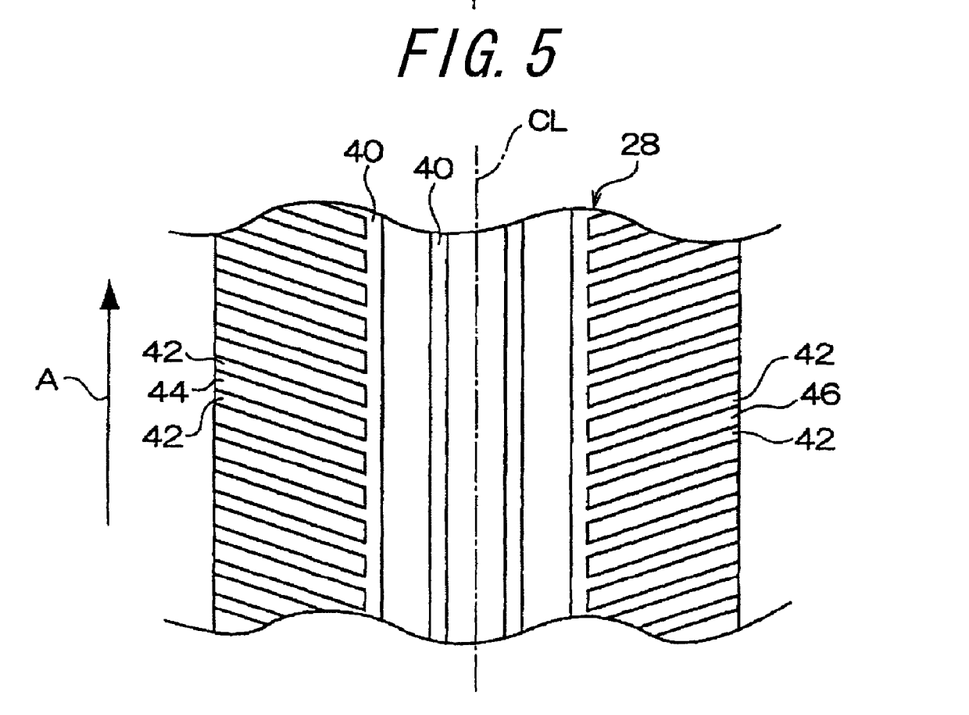
FIG. 5 is a development view of a tread of Comparative Example tire 1.

Comparative Example tire 1 has a pattern shown in FIG. 5. This tire is prepared to be compared with Example tire 2 and has the same configuration of that of Example tire 2 except for a groove width. This tire has wide inclined grooves 42 having a width of 5 mm and land portions having the same width of 8 mm as that of Example tire 2.

Comparative Example Tire 2

Figure 6:
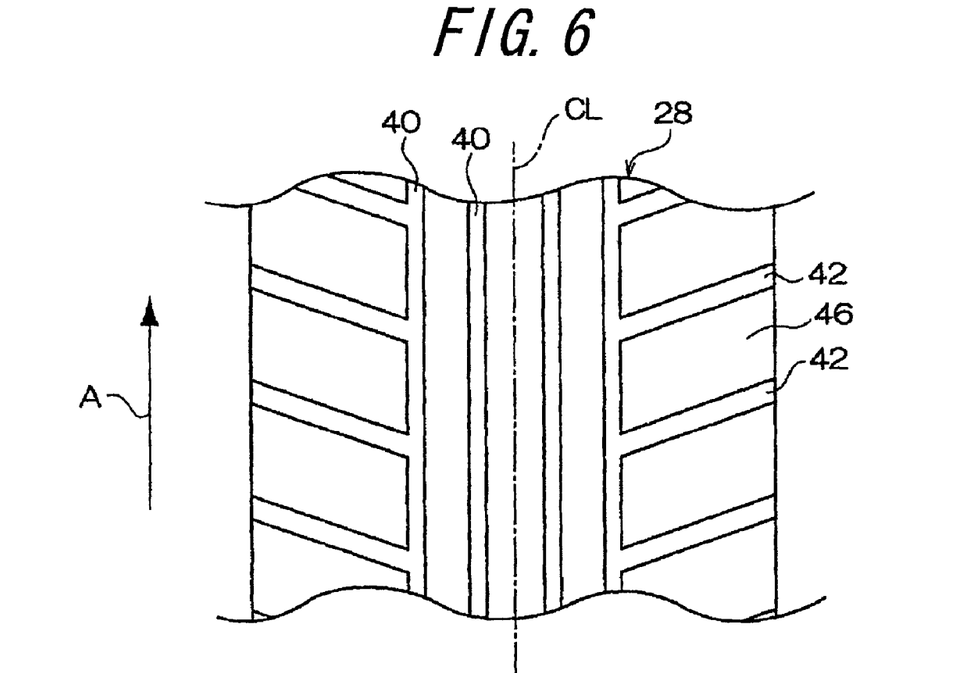
FIG. 6 is a development view of a tread of Comparative Example tire 2.

Comparative Example tire 2 has a typical pattern of a conventional tire as shown in FIG. 6. Only wide inclined grooves 42 having a groove width of 8 mm are provided in the tread side portions. A land portion 46 between the wide inclined grooves 42 has a width of 26 mm, which is more than 20 mm specified in the present invention. Only wide inclined grooves 42 having a groove width of 8 mm are provided in the tread side portions and narrow inclined grooves 44 having a width within a range between 0.3 mm and 2.5 mm of the present invention are not provided.

Comparative Example Tire 3

Figure 7:
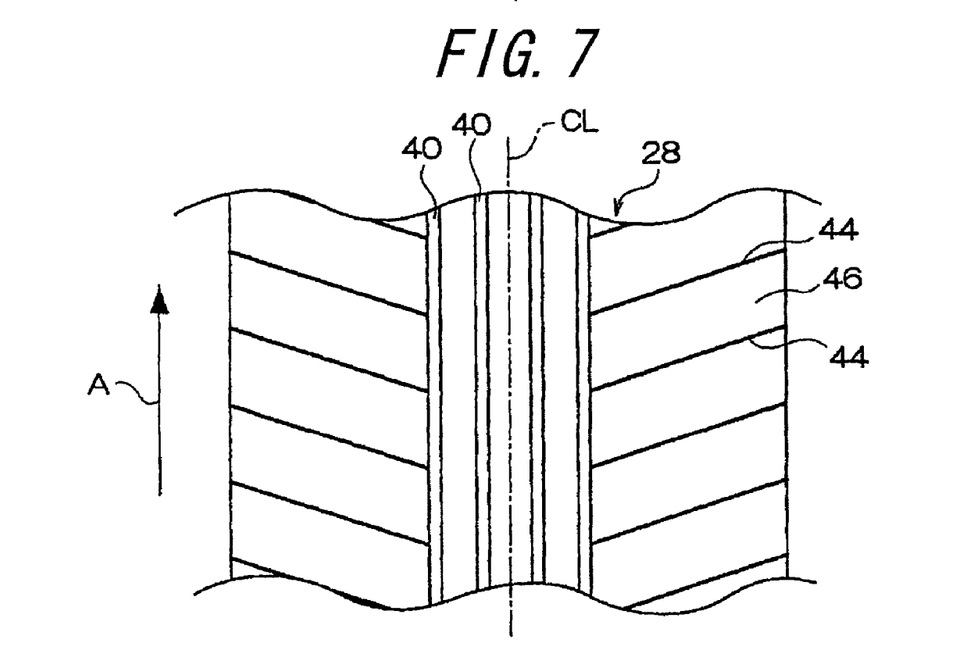
FIG. 7 is a development view of a tread of Comparative Example tire 3.

Comparative Example tire 3 has a pattern shown in FIG. 7. This tire has a similar configuration of that of Comparative Example tire 2 except that the narrow inclined grooves 44 have a groove width of 1 mm. The tire satisfies the condition of the groove width of the present invention but land portion 46 separated by the narrow inclined grooves 44 has a wider width of 26 mm than the scope of claim 3.

Hereinafter, test results will be described.

(Test Results of Example Tire 1)

Pattern: FIG. 2

Lap time: 52.4 seconds

Wet running rating: 9 points

Rider's comment: Very stable in a corner where the vehicle body is largely inclined. High brake performance of a front wheel in entering a corner from a linear course and able to enter the corner at ease. High grip performance of a front wheel also in turning with the vehicle body being largely inclined at a constant speed and easy to navigate.

(Test Results of Example Tire 2)

Pattern: FIG. 3

Lap time: 51.9 seconds

Wet running rating: 10 points

Rider's comment: Basically same as that of Example tire 1. Slightly higher grip performance than that of Example tire 1.

(Test Results of Example Tire 3)
Pattern: FIG. 4
Lap time: 52.7 seconds
Wet running rating: 8 points
Rider's comment: Basically same as that of Example tire 1. Softer tire in braking and less sufficient stiffness than that of Example tire 1.

(Test Results of Comparative Example Tire 1)
Pattern: FIG. 5
Lap time: 54.5 seconds
Wet running rating: 6 points
Rider's comment: Slightly lower brake performance of a front wheel in entering a corner from a linear course. Unable to enter the corner with ease without sufficient reduction of speed. Lower grip performance of a front wheel also in turning with the vehicle body being largely inclined at a constant speed.

(Test Results of Comparative Example Tire 2)
Pattern: FIG. 6
Lap time: 55.7 seconds
Wet running rating: 4 points
Rider's comment: Significantly low brake performance and no grip feeling of a front wheel in entering a corner from a linear course. Unable to incline the vehicle body due to no grip even by trying to incline the vehicle body largely.

(Test Results of Comparative Example Tire 3)
Pattern: FIG. 7
Lap time: 56.1 seconds
Wet running rating: 3 points
Rider's comment: Lower grip performance and slippy. Unable to increase the speed in a high-speed corner due to generation of hydroplaning. Significantly low brake performance of a front wheel and felt scared in entering a corner from a linear course.

Validation of the Test Results

Example tires 1 and 2 apparently have higher wet driving stability than Comparative Example tires. It is confirmed that the tires of the present invention work well as compared to most conventional tires, as is the case with Comparative Example tire 1, having an average pattern, in which a wide groove are formed on the circumference.

It is confirmed that, from the correlation between Example tires 1, 2 and Comparative Example tire 1, grooves are provided with a narrow spacing therebetween and the groove width is narrowed to increase an area of rubber contacting a road surface so that grip performance can be improved.

In this test with an actual vehicle, Example tire 2 exhibits the highest grip performance. It is considered that this is because an area of the land portions is increased by reducing the groove width and the area of the land portions are separated by reducing a spacing between grooves to an extent so that water sandwiched between the land portion and a road surface can reach a groove to be drained. It is found that even when a groove with a wide groove width is provided as is the case with Comparative Example tire 1, drainage effect is not significantly improved but a groove having a width of 1 mm can sufficiently drain water.

By comparing Example tire 3 with Comparative Example tires 2 and 3, pattern directionality can be discussed. In case of a front wheel, braking performance is important performance and a braking force is likely applied to a tire having a pattern like Example tire 1. On the contrary, in Example tire 3, when a braking force and a lateral force are applied, their resultant force is not oriented to the same direction as the inclination of the grooves so that the grip force is reduced.

All of Example tires according to the present invention are confirmed to significantly improve wet driving stability as compared to Comparative Example tires.

Second Embodiment

Next, a second embodiment of a pneumatic tire for a motorcycle of the present invention will be described with reference to FIGS. 8 and 9. Elements identical to those of the first embodiment are denoted by the same numerals and their explanation will be omitted.

(Carcass)

Figure 8:
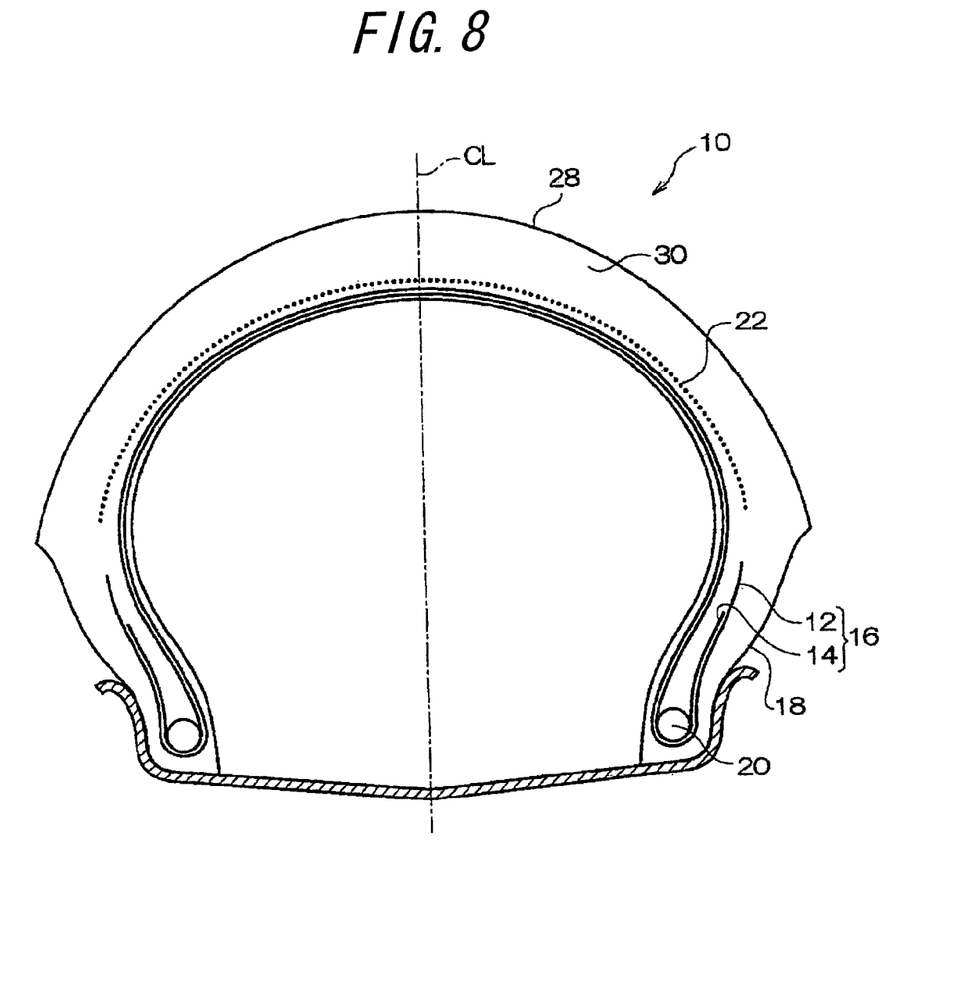
FIG. 8 is a sectional view of a pneumatic tire for a motorcycle along an axis of rotation according to a second embodiment.

As a sectional view along an axis of rotation of a tire is shown in FIG. 8, a pneumatic tire 10 for a motorcycle of this embodiment has a carcass 16 consisting of a first carcass ply 12, in which cords extending in the inclined direction with respect to a tire equatorial plane CL are embedded and a second carcass ply 14 in which cords extending in the opposite inclined direction of said cords with respect to the tire equatorial plane CL.

The tire 10 for a motorcycle of this embodiment is used for a rear wheel and has a tire size of 190/50R17.

Both ends of the first carcass ply 12 and the second carcass ply 14 are turned around bead cores 20, which are embedded in bead portions 18, from the inner to outer sides of the tire.

The first carcass ply 12 is formed by arranging a plurality of cords (nylon) extending in the radial direction of the tire parallel to one another to be embedded in coating rubber. In this embodiment, an angle of the cords at the tire equatorial plane with respect to the tire equatorial plane is set to 70 degrees. The second carcass ply 14 is also formed by arranging a plurality of cords (nylon) extending in the radial direction of the tire parallel to one another to be embedded in coating rubber. In this embodiment, an angle of the cords with respect to tire equatorial plane is set to 70 degrees.

The cords of the first and second carcass plies 12, 14 intersect with each other and are inclined in the opposite directions with respect to the tire equatorial plane CL. Although in this embodiment the angle of the cords is set to 70 degrees, it may be other value such as 90 degrees.

(Spiral Belt Layer)

A spiral belt layer 22 is provided radially outside of this carcass 16.

The spiral belt layer 22 of this embodiment is formed by spirally winding cord plying of three steel cords having a diameter of 0.2 mm to be embedded in coating rubber with a thread density of 60 threads per 50 mm.

Tread rubber forming a tread 28 is provided radially outside of the spiral belt layer 22.

(Tread Pattern)

Figure 9:
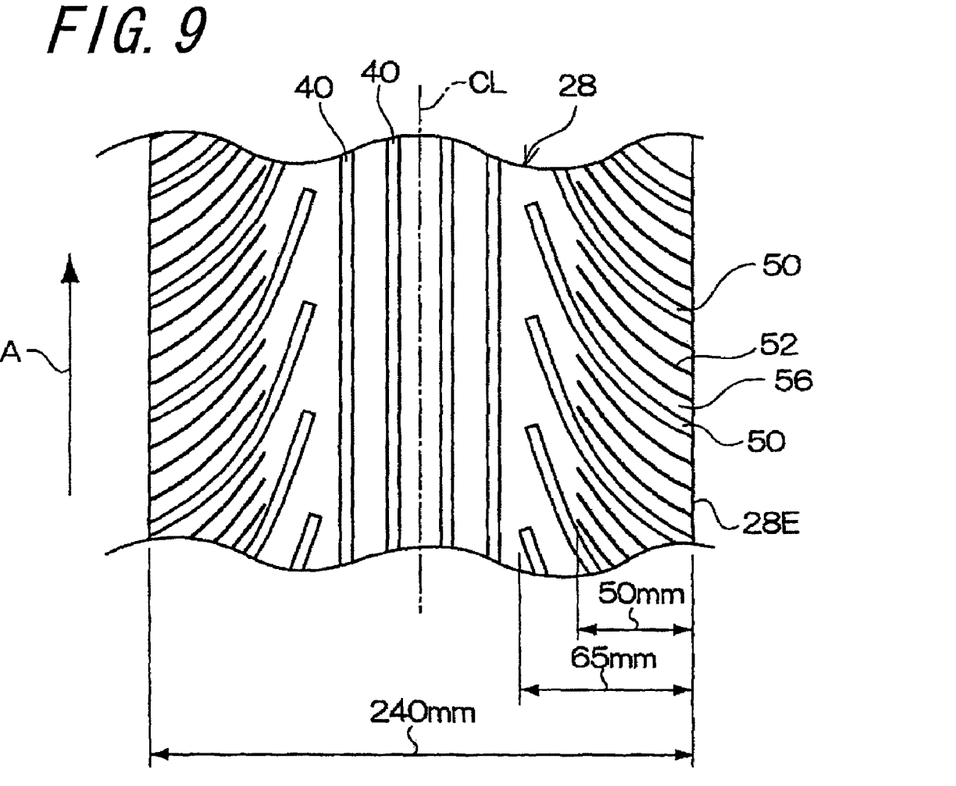
FIG. 9 is a development view of a tread of a pneumatic tire (Example tire 4 in tests) for a motorcycle according to a second embodiment.

FIG. 9 is a development view of a tread 28, in which two circumferential main grooves 40 which have a groove width of 5 mm and extend in the circumferential direction of the tire are provided in each side of the tire equatorial plane CL. There are also provided, in the tread 28, curved wide inclined grooves 50 and curved narrow inclined grooves 52 extending from a location distant from the circumferential main groove 40 located outside in the width direction of the tire towards a tread end.

In this embodiment, three narrow inclined grooves 52 are provided between wide inclined grooves 50.

In this embodiment, all of the circumferential main groove 40, the wide inclined groove 50 and the narrow inclined groove 52 have a groove depth of 6 mm.

The developed width of the tread 28 of this embodiment is 240 mm. The wide inclined grooves 50 have a groove width of 4 mm and are formed in a region of 65 mm from the tread end 28E to the tire equatorial plane side. The narrow inclined grooves 52 have a groove width of 0.7 mm and are formed in a region of 50 mm from the tread end 28E to the tire equatorial plane side.

Angles of the wide inclined groove 50 and the narrow inclined groove 52 with respect to the circumferential direction of the tire are respectively 17 degrees and 30 degrees at the tire equatorial plane and both are 60 degrees at the tread end.

In this embodiment, a ratio of a total area of the wide inclined grooves 50 to an area of the tread side portion is set to about 10%.

In this embodiment, elongated land portions 56 separated by the grooves in the tread side portion is set to have a width of 8 mm.

The measurement of the width of the elongated land portions 56, the groove width of the wide inclined grooves 50 and the groove width of the narrow inclined grooves 52 is performed at a location 30 mm distant from the tread end 28E toward the tire equatorial plane.

Since the cross-sectional shape of the tread 28 of a tire for a motorcycle is round and pattern ends are also round, when the pattern shown in FIG. 9 is grooved, just like paper attached to a globe, a groove decreases its width as it gets closer to the pattern ends.

Also in this embodiment, both of the grooves and the land portions are formed in such a manner that their width is narrowed as the grooves and the land portions get closer to the pattern ends. Therefore, in order to measure an average value of the groove width in the pattern side portion, the grooves having the above-mentioned groove width are formed at a location 30 mm distant from the tread end.

(Operation)

Next, the operation of the pneumatic tire 10 for a motorcycle of this embodiment will be described.

This pneumatic tire 10 for a motorcycle exerts the effect of the present invention when used as a rear wheel. The wide inclined groove 50 and the narrow inclined groove 52 are inclined so that the tire equatorial plane side thereof is located ahead of the tread end side thereof in the rotation direction of the tire (in the direction of an arrow A). Therefore, when a lateral force and a driving force are simultaneously applied, their resultant force is oriented to the same direction of the inclination of the inclined grooves (that is, the direction of the resultant force is substantially parallel to the longitudinal direction of the elongated land portion 56) so as to effectively restrain deformation of the elongated land portion 56.

In the pneumatic tire 10 for a motorcycle of this embodiment, a plurality of the wide inclined grooves 50 and the narrow inclined grooves 52 which continuously extend over a region of 50% or more of the width of the tread side portion are provided, the narrow inclined grooves 52 have a groove width within a range between 0.3 mm and 2.5 mm and a total area of the wide inclined grooves 50 is set to not more than 20% of an area of the tread side portion, to satisfy both of drainage performance and block stiffness of the tread contact portion in turning at a high level and to obtain a higher grip force in turning on a wet road surface than that of conventional tires.

When the narrow inclined grooves 52 have a length of their tire widthwise component of not more than the above-mentioned length, the grooves themselves have no use and drainage effect becomes insufficient.

On the other hand, when a total area of the wide inclined grooves 50 is more than 20% of an area of the tread side portion, drainage effect is increased but a surface area of the land portion of the tread side portion is extremely reduced so that an area of the tread contacting the road surface is reduced to reduce a grip force.

The narrow inclined grooves 52 having a groove width of less than 0.3 mm cannot obtain sufficient drainage effect. In addition, in this case, molding parts, which is used for forming a groove and referred to as a blade, have too thin a thickness to obtain durability of the mold.

When a spacing between grooves in the tread side portion is less than 5 mm, a land portion formed between grooves becomes so thin as to extremely reduce stiffness of the land portion. On the other hand, when a spacing between grooves in the tread side portion is more than 20 mm, an area of the land portion formed between grooves is so large as to increase a travel distance of water squeezed by the land portion surface and the road surface to be drained to near grooves and more likely to cause a hydroplaning phenomenon.

When a motorcycle turns a deep corner, using with the vehicle body being largely inclined and with a region near the tread end portion of the tire contacting a road surface, the tire is subjected to a larger force in the lateral direction than a force in back and forth direction. Therefore, the land portion near the tread end preferably extends along the force in the lateral direction, that is, similar to the pneumatic tire for a motorcycle of this embodiment, the angle of the inclined groove separating the land portion in the shoulder side is preferably set within a range between 50 degrees and 90 degrees.

When a motorcycle leaves a corner by accelerating from a state where the vehicle body is largely inclined, the rear tire is subjected to a driving force in addition to a lateral force. With acceleration, the inclined vehicle body is gradually raised. That is, with acceleration the tread contact region of the tire moves from the tread end side to the tire equatorial plane side. With acceleration, a ratio of a lateral force is reduced and a ratio of an accelerating force is increased so that their resultant force gets closer to the circumferential direction from the lateral direction of the tire. Therefore, it is preferable that the angle of the inclined groove in the tire equatorial plane side is set within a range between 10 degrees and 30 degrees.

(Test for Rear Wheel)

In order to ensure the effect of the performance improvement of the present invention, a comparative test on driving stability with an actual vehicle on a wet road surface is conducted and the test results will be described below.

In the test, several test tires are prepared to be used for a rear wheel and a conventional tire is consistently used for a front wheel.

A test tire is mounted on a rear wheel of a sports motorcycle of 1000 cc and the test is very severely (closely to limit) conducted with the actual vehicle in the light rain on a test course. An amount of rainfall is constant for a whole day and the wet condition is kept constant.

As for one test tire, four circuits of a test course are made and the average lap time of the four circuits is obtained. Since all of the test tires have the same pattern in the tread center portion, turning performance in cornering is different.

At the same tire, a test rider totally evaluates his sensitivity to driving stability on a wet road surface on a scale of one to ten. The test results include comments of the test rider.

First, test tires will be described.

Example Tire 4

Example tire 4 is a tire of the above-mentioned second embodiment, having a pattern shown in FIG. 9.

Example Tire 5

Figure 10:
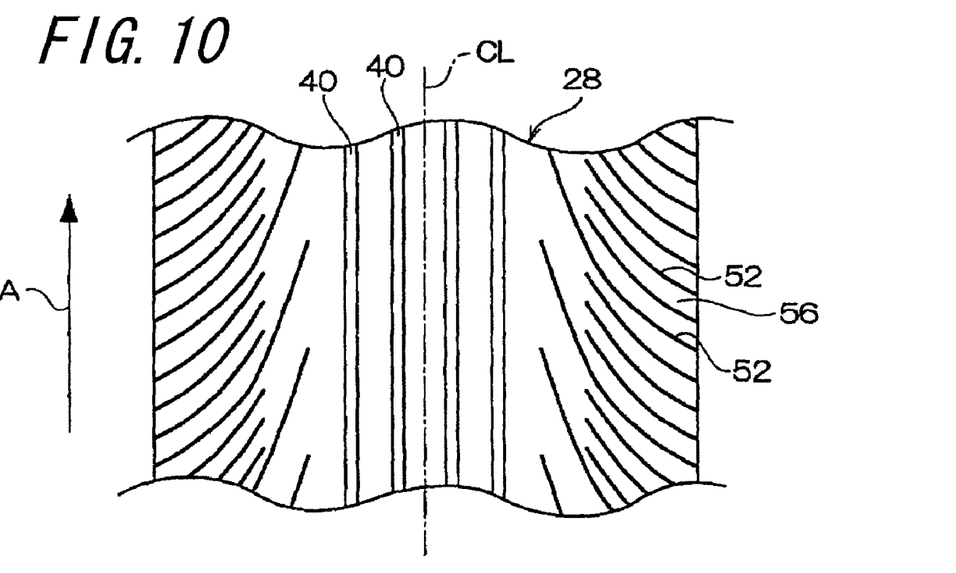
FIG. 10 is a development view of a tread of Example tire 5.

Example tire 5 has a pattern shown in FIG. 10, which is substantially same as that of Example tire 4. The difference is that the narrow inclined grooves 52 having a groove width of 0.7 mm are substituted for the wide inclined grooves 50 having a groove width of 4 mm.

Example Tire 6

Figure 11:
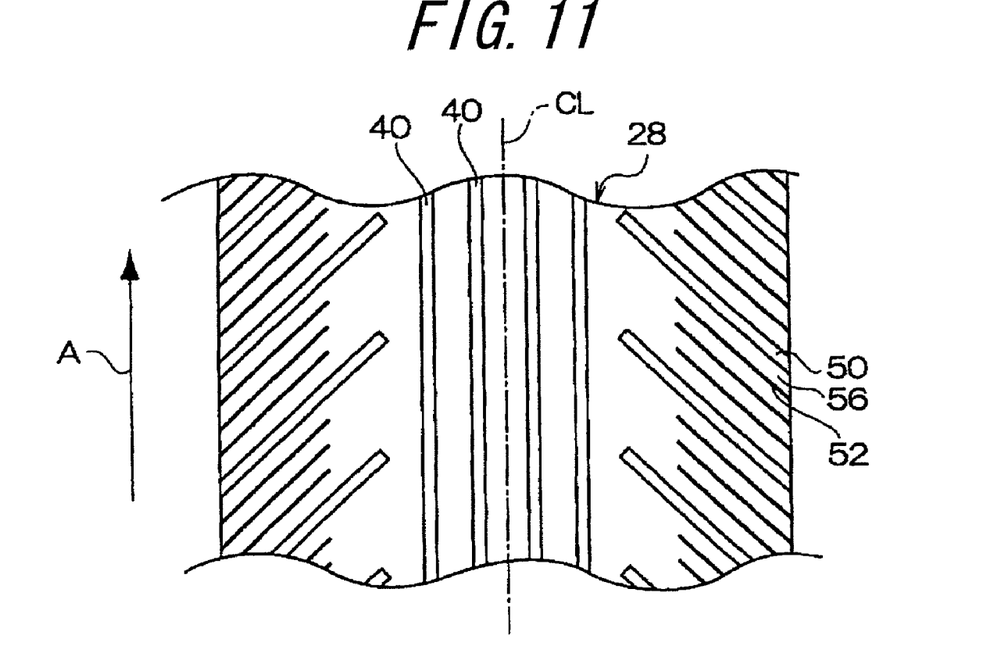
FIG. 11 is a development view of a tread of Example tire 6.

Example tire 6 has a pattern shown in FIG. 11, in which linear grooves are substituted for the curved inclined grooves in the pattern of Example tire 4. Wide inclined grooves 50 have the same groove width of 4 mm and narrow inclined grooves 52 have the same groove width of 0.7 mm as those of Example tire 4. Land portions 56 separated by the inclined grooves have the same width of 9 mm as that of Example tire 4. The inclined angle of the inclined grooves with respect to the tire equatorial plane CL is 50 degrees. A ratio of an area of wide inclined grooves 50 to an area of the tread side portions is 10%, similar to that of Example tire 4.

Comparative Example Tire 4

Figure 12:
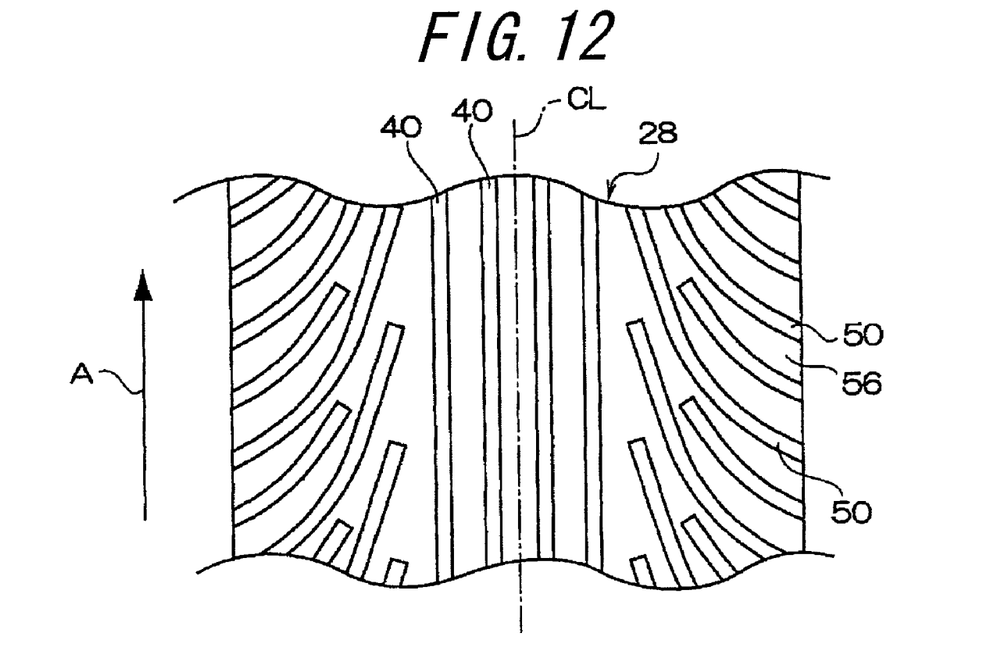
FIG. 12 is a development view of a tread of Comparative Example tire 4.

Comparative Example tire 4 has a pattern shown in FIG. 12, in which one wide inclined groove 50 is substituted for the three narrow inclined grooves 52 in the pattern of Example tire 4. All of the wide inclined grooves 50 have a wider groove width of 5 mm. There are no narrow inclined grooves 52 having a groove width within a range between 0.3 mm and 2.5 mm, which are specified in the present invention and all grooves are wide grooves having a groove width of more than 2.5 mm. The pattern of Comparative Example tire 4 is a typical example of a conventional pattern based on a streamline. The land portion 56 between the wide inclined grooves 50 has a width of 12 mm.

Hereinafter, test results will be described.

(Test Results of Example Tire 4)
Pattern: FIG. 9 (Streamline. Both of wide and narrow grooves are provided in the tread side portion.)
Lap time: 51.7 seconds
Wet running rating: 9 points
Rider's comment: Very stable in a corner where the vehicle body is largely inclined. Good grip performance in accelerating with opening the throttle from a state where the vehicle body is largely inclined. Excellent traction performance.

(Test Results of Example Tire 5)
Pattern: FIG. 10 (Streamline. Only narrow grooves are provided in the tread side portion)
Lap time: 51.9 seconds
Wet running rating: 9 points
Rider's comment: Basically same as that of Example tire 4. High grip level. Excellent grip performance in accelerating with opening the throttle from a state where the vehicle body is largely inclined, similar to that of Example tire 4.

(Test Results of Example Tire 6)
Pattern: FIG. 11 (Linear type. Both of wide and narrow grooves are provided in the tread side portion.)
Lap time: 52.5 seconds
Wet running rating: 8 points
Rider's comment: Totally high grip performance. Lower traction performance than that of Example tire 4 in accelerating with opening the throttle from a state where the vehicle body is largely inclined to a state where the vehicle body is raised.

(Test Results of Comparative Example Tire 4)
Pattern: FIG. 12 (Streamline. Conventional type)
Lap time: 54.8 seconds
Wet running rating: 4 points
Rider's comment: Low grip performance. Tire idling in accelerating with opening the throttle from a state where the vehicle body is largely inclined. Tire skid and no move forward.

Validation of the Test Results

All of Example tires 4 to 6 apparently have higher wet driving stability than Comparative Example tire 4. It is confirmed that the tires of the present invention work well as compared to most conventional tires, as is the case with Comparative Example tire 4, having an average pattern consisting of only wide grooves having a wide groove width.

It turns out that from comparison of Example tire 4 with Example tire 5, wet turning performance can be ensured even if grooves having a narrow groove width are provided. It is considered that even grooves having a narrow groove width sufficiently exert drainage effect.

It turns out that from comparison of Example tire 4 with Example tire 6, by setting the angle of the grooves with respect to the tire equatorial direction within a range between 10 degrees and 30 degrees in the tire center side and within a range between 50 degrees and 90 degrees in the tread end portion, the tire having such grooves is suitable for a motorcycle having properties that the motorcycle accelerates while gradually raising its inclined vehicle body.

That is to say, when the vehicle body is largely inclined, especially a force in the lateral direction is largely applied so that the grooves had better extend substantially in the lateral direction. When a motorcycle accelerates while raising its vehicle body, a force in the accelerating direction is dominant so that the grooves had better extend substantially in the tire equatorial plane.

Comparative Example tire 4 having a typical configuration of a conventional tire is inferior in performance as compared to Example tires.

That is to say, it is confirmed that Example tires of the present invention significantly improve wet driving stability as compared to any of Comparative Example tires.

Other Embodiments

In the above-mentioned embodiments, there are provided, in the tread side portion, wide inclined grooves and narrow inclined grooves inclined at an angle of less than 90 degrees with respect to the circumferential direction of the tire. Alternatively, instead of these wide inclined grooves and narrow inclined grooves, there may be provided, in the tread side portion, wide lateral grooves and narrow lateral grooves extending in the width direction of the tire.

In the above-mentioned embodiments, wide inclined grooves and narrow inclined grooves are provided in the tread side portion. Alternatively, only narrow inclined grooves may be provided in the tread side portion.

When only either of wide lateral grooves or narrow inclined grooves are provided in the tread side portion, a spacing between grooves is preferably set within a range between 5 mm and 20 mm and a ratio of a total area of the narrow lateral grooves or the narrow inclined grooves to a surface area of the tread side portion is preferably set within a range between 5% and 20%.

The invention claimed is:

1. A pneumatic motorcycle tire, comprising
a tread consisting of a tread central portion having a width of 60% of a tread developed width with a tire equatorial plane being as its center and tread side portions located outside of the tread central portion in the width direction of the tire, and
at least one of a plurality of lateral grooves along the width direction of the tire and a plurality of inclined grooves inclined at an angle of less than 90 degrees with respect to the circumferential direction of the tire formed in the tread side portion such that the grooves continuously extend over a region of 50% or more of a width of the tread side portion and are spaced in the circumferential direction of the tire, wherein
the plurality of the lateral/inclined grooves comprise lateral/inclined grooves having a groove width of more than 2.5 mm and a narrow lateral/inclined groove, which continuously extends over a region of 50% or more of the width of the tread side portion and has a groove width within a range between 0.3 mm and 2.5 mm,
a total area of the plurality of the lateral/inclined grooves having a groove width of more than 2.5 mm is set to not more than 20% of an area of the tread side portion, and
the tread central portion comprises at least two circumferential grooves and a land portion sandwiched by the at least two circumferential grooves, the land portion extending continuously in the circumferential direction of the tire.

2. The pneumatic motorcycle tire according to claim 1, wherein a spacing between grooves is within a range between 5 mm and 20 mm in the tread side portion.

3. The pneumatic motorcycle tire according to claim 1, wherein the inclined groove is inclined so that a shoulder side thereof is located ahead of the tire equatorial plane side thereof in the forward rotation direction of the tire.

4. The pneumatic motorcycle tire according to claim 3, wherein the inclined groove increases its angle with respect to the circumferential direction of the tire from the tire equatorial plane side to the shoulder side so that the angle in the tire equatorial plane side is set within a range between 10 degrees and 30 degrees and the angle in the shoulder side is set within a range between 50 degrees and 90 degrees.

5. The pneumatic motorcycle tire according to claim 1, wherein the inclined groove is inclined so that the tire equatorial plane side thereof is located ahead of a shoulder side thereof in the forward rotation direction of the tire.

6. The pneumatic motorcycle tire according to claim 5, wherein the inclined groove increases its angle with respect to the circumferential direction of the tire from the tire equatorial plane side to the shoulder side so that the angle in the tire equatorial plane side is set within a range between 10 degrees and 30 degrees and the angle in the shoulder side is set within a range between 50 degrees and 90 degrees.

* * * * *